US010562351B2

(12) United States Patent
Purushothaman et al.

(10) Patent No.: US 10,562,351 B2
(45) Date of Patent: Feb. 18, 2020

(54) SOLID-TIRE-AND-HUB ASSEMBLY

(71) Applicant: Goodrich Aerospace Services Private Limited, Bangalore, Karnataka (IN)

(72) Inventors: Srijith Purushothaman, Bangalore (IN); Kiran Manjunatha, Mysore (IN); Satya Swaroop Panda, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/005,573

(22) Filed: Jan. 25, 2016

(65) Prior Publication Data

US 2016/0214436 A1 Jul. 28, 2016

(30) Foreign Application Priority Data

Jan. 27, 2015 (IN) .............................. 225/DEL/2015

(51) Int. Cl.
*B60C 7/10* (2006.01)
*B60B 3/02* (2006.01)
*A63C 17/22* (2006.01)
*B60C 7/00* (2006.01)
*B60B 33/00* (2006.01)

(52) U.S. Cl.
CPC ............... *B60C 7/10* (2013.01); *A63C 17/22* (2013.01); *B60B 3/02* (2013.01); *B60C 7/00* (2013.01); *B60B 33/0063* (2013.01); *B60Y 2200/15* (2013.01)

(58) Field of Classification Search
CPC .... B60C 7/10; B60C 7/08; B60C 7/06; B60C 7/102; B60C 7/00; A63C 17/22; A63C 17/223; A63C 17/24; B60B 33/0063; B60B 3/02

USPC ......... 301/5.301, 5.302, 5.303, 5.306, 5.307, 301/5.309
See application file for complete search history.

(56) References Cited

U.S. PATENT DOCUMENTS

| 884,720 A * | 4/1908 | Curtis ................... A63C 17/22 301/5.7 |
| 6,142,203 A * | 11/2000 | Bickford .................. B60C 7/10 152/267 |
| 6,645,415 B2 * | 11/2003 | Takatsu ............. B29C 45/14311 264/255 |

(Continued)

FOREIGN PATENT DOCUMENTS

| CN | 203957694 U | 11/2014 | |
| JP | 2006096173 A | 4/2006 | |
| JP | 5492629 B2 * | 5/2014 | ............... B60C 7/00 |

*Primary Examiner* — Scott A Browne
(74) *Attorney, Agent, or Firm* — Cantor Colburn LLP

(57) ABSTRACT

A solid-tire-and-hub assembly is provided. The assembly includes a solid tire defining a pair of opposed, spaced side surfaces and a pair of opposed, spaced facial surfaces extending between the side surfaces such that the solid tire defines a substantially trapezoidal transverse cross-section. The solid tire is disposed about a partially hollow hub, which defines a substantially "I" transverse cross-section substantially aligned with the cross-section of the solid tire, an axial aperture configured to receive a drive shaft, and a plurality of holes defined about the aperture. A power-drive unit is also provided. The unit includes a housing, a drive shaft, and at least one of the solid-tire-and-hub assembly connected to the housing.

11 Claims, 2 Drawing Sheets

(56) References Cited

U.S. PATENT DOCUMENTS

| | | | |
|---|---|---|---|
| 6,752,471 B2* | 6/2004 | Hsia | B29C 39/10 |
| | | | 301/5.307 |
| 8,011,734 B1* | 9/2011 | Johnson | B60B 19/08 |
| | | | 301/5.1 |
| 10,035,378 B2* | 7/2018 | Costlow | B60C 7/26 |
| 2012/0193969 A1* | 8/2012 | Tso | F16H 55/171 |
| | | | 301/5.1 |
| 2014/0083586 A1* | 3/2014 | Korus | B60C 7/10 |
| | | | 152/301 |
| 2014/0312589 A1* | 10/2014 | Cassidy | A63C 17/0046 |
| | | | 280/87.042 |

* cited by examiner

SOLID-TIRE-AND-HUB ASSEMBLY

FIELD OF INVENTION

The subject matter disclosed herein relates generally to the field of tires and, more particularly, to solid-tire-and-hub assemblies implemented with cargo-related applications.

BACKGROUND

A solid (non-pneumatic) or flat-free tire generally is puncture-resistant and does not blowout under high loads, which makes it suitable for slow-moving industrial cargo applications that require heavy lifting. As such, this type of tire is typically implemented and functions as a conveyor wheel or drive roller in power-drive units (PDUs), transmission devices, forklifts, hand trucks, medical-mobility equipment, lawn mowers, automobiles, freighter common turntables for aircraft, etc.

A two- or three-inch cargo PDU tire, for example, experiences a vertically downward-acting load and a traction load acting on a cross-section of the tire. The vertical load mainly contributes to high strain at a location of an edge of the tire (referred to hereinafter merely as "the edge strain") while the traction load mainly contributes to high strain on a center of the tire (referred to hereinafter merely as "the center strain"). These strains together are dictated by design of an assembly of both the tire and a corresponding hub. For such a design, the strains are inversely proportionate to each other subject to changing thickness of the assembly. More specifically, while one strain increases, the other decreases and vice versa. In this way, it is not possible to decrease, for instance, the edge strain without affecting the center strain.

BRIEF DESCRIPTION OF INVENTION

According to a non-limiting exemplary embodiment of the invention, a solid-tire-and-hub assembly is provided. The assembly includes a solid tire defining a pair of opposed, spaced side surfaces and a pair of opposed, spaced facial surfaces extending between the side surfaces such that the solid tire defines a substantially trapezoidal transverse cross-section. The solid tire is disposed about a partially hollow hub, which defines a substantially "I" transverse cross-section substantially aligned with the cross-section of the solid tire, an axial aperture configured to receive a drive shaft, and a plurality of holes defined about the aperture.

In aspects of the embodiment, an interior outer portion of each of the side surfaces of the solid tire is arcuate such that the interior outer portions are concave with respect to the hub. The facial surfaces of the solid tire include an exterior facial surface extending between corresponding exterior edges of the side surfaces and being substantially planar in the cross-section. An interior facial surface extends between corresponding interior edges of the side surfaces and is arcuate and substantially concave with respect to the exterior facial surface and in contacting relationship with the hub.

In a further aspect, a maximum thickness of the solid tire through the cross-sections is about 4.4 mm.

In a further aspect, a radius of curvature of the interior outer portion of each of the side surfaces of the solid tire is about 4.0 mm.

In a further aspect, an angle from an imaginary chord extending between the corresponding interior edges of the solid tire to a substantially linear interior central portion of each side surface is about 54.0 degrees.

In a further aspect, an arc radius of the interior facial surface of the solid tire is about 90 mm.

In further aspects, the hub defines a pair of opposed, spaced, substantially linear outer side surfaces and a pair of opposed, spaced, substantially linear inner side surfaces. An exterior facial surface extends between corresponding exterior edges of the outer side surfaces of the hub and is arcuate and substantially concave with respect to the solid tire and in contacting relationship with the interior facial surface of the solid tire. Each of a pair of opposed, spaced interior facial surfaces each extends between correspondingly an exterior edge of the inner side surface to an interior edge of the outer side surface of the hub. At least one innermost surface is defined by the aperture.

In a further aspect, the aperture and holes extend through a core of the hub.

Also according to a non-limiting exemplary embodiment of the invention, a power-drive unit is provided. The unit includes a housing, a drive shaft, and at least one of the solid-tire-and-hub assembly connected to the housing.

The solid-tire-and-hub assembly according to the invention defines particular constant and varying profiles or cross-sections through a periphery of the assembly and respective design features. These profiles and features achieve a significant reduction in the edge strain of the assembly while keeping the center strain thereof substantially unchanged. Also, performance of the solid-tire-and-hub assembly is enhanced and highly reliable without any significant change to a size, shape, or manufacturing process of the assembly. Furthermore, the solid-tire-and-hub assembly is highly durable (i.e., does not crack) such that life thereof is extended. In addition, the solid-tire-and-hub assembly allows the tractive load to act on a larger area of the assembly and, in turn, help to achieve a significant reduction in the offset edge and center strains.

BRIEF DESCRIPTION OF DRAWING

The subject matter that is regarded as the invention is particularly pointed out and distinctly claimed in the claims at the conclusion of the specification. The foregoing and other features and advantages of the invention are apparent from the following detailed description taken in conjunction with the accompanying drawing in which:

DETAILED DESCRIPTION OF INVENTION

Figure 1:
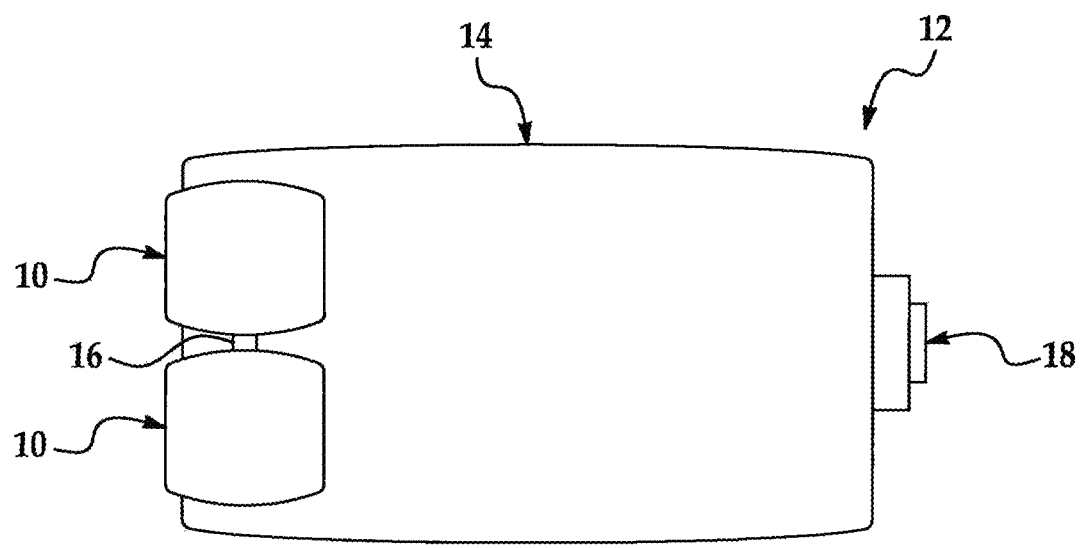
FIG. 1 is a diagrammatical top view of a non-limiting exemplary embodiment of a power-drive unit (PDU) according to the invention.

The figures show a non-limiting exemplary embodiment of a solid-tire-and-hub assembly according to the invention, generally indicated at 10, configured to be implemented with, in general, slow-moving industrial cargo applications that require heavy lifting. In this regard, although the assembly 10 is disclosed herein as being implemented and functioning as a two- or three-inch rubber-coated conveyor wheel or drive roller 10 in an aircraft power-drive unit (PDU), it should be readily appreciated that the assembly 10 may be any suitable size and implemented in any suitable type of PDU (aircraft or otherwise). It should be readily appreciated also that the assembly 10 may be implemented with any other such applications—including transmission devices, forklifts, hand trucks, medical-mobility equipment, lawn mowers, and freighter common turntables for aircraft. It should be readily appreciated also that the assembly 10 may be implemented with any other suitable applications (e.g., related to automobiles) and cargo-handling systems.

A cargo aircraft includes a cargo-loading system that, in turn, has a main cargo door through which cargo containers and pallets [collectively known as "unit load devices" (ULDs)] enter and exit a main cargo deck within a main cargo compartment. Cargo within the main cargo deck of the aircraft is typically supported by a system of freely rotating floor-mounted conveyance rollers. Installed on the main cargo deck are a plurality of PDUs. Sets or banks of the PDUs can be simultaneously elevated from beneath the main cargo deck to a level just above the conveyance rollers. Each PDU may be a separate electro-mechanical actuator that includes at least one assembly 10. The assemblies 10 of the elevated PDUs contact and move the cargo above the conveyance rollers in a commanded direction upon energization of the PDUs. The movement of the cargo depends upon a coefficient of friction between the assemblies 10 and a bottom surface of the cargo as well as a lifting force generated by respective lift mechanisms of the PDUs. When the PDUs are de-energized, rotation of the assemblies 10 ceases, and the cargo stops moving. Several sets of PDUs can be arranged along a common path of conveyance, and each set can be operated separately, thereby allowing for transfer of multiple pieces of the cargo. Loading personnel can guide the cargo by a joystick, typically in combination with other switches, buttons, and/or similar controls.

In the aircraft, most of the PDUs are arranged in rows on either side of a longitudinal centerline of the main cargo deck. The ULDs loaded into the aircraft typically are arranged in two rows, one on either side of the centerline. It should be readily appreciated that such ULDs on a given side are propelled in a longitudinal direction by the PDUs located on that side. Additional PDUs may be found in an omni-directional area proximate the main cargo door. It should be readily appreciated that the main cargo deck of a typical cargo aircraft is also provided with various non-powered rollers, guides, restraints, and the like.

In a large cargo aircraft, there may be several dozen PDUs. To control the PDUs, the cargo-loading system is provided with a number of features. Among these are a controller, (sometimes called a "main controller unit"), main control panel, and plurality of local control panels—including control panels on a left side of the centerline and right side of the centerline as the front of the aircraft is laced. During loading and unloading operations, two- or three-person teams are common.

Figure 2:
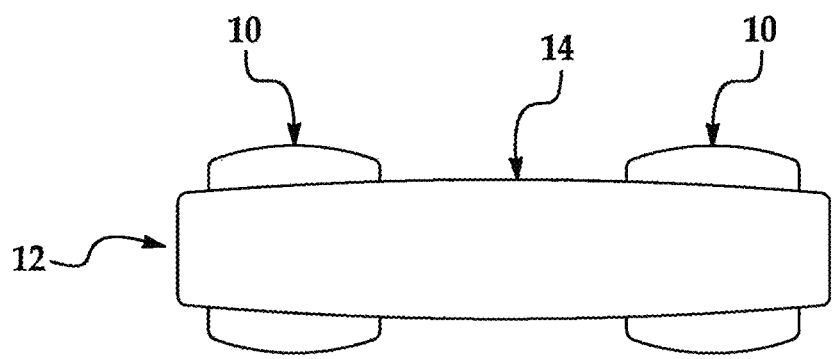
FIG. 2 is a diagrammatical end view of the embodiment of the PDU illustrated in FIG. 1.

Referring now to FIGS. 1 and 2, a non-limiting exemplary embodiment of a PDU according to the invention is generally indicated at 12. The PDU 12 includes a housing, generally indicated at 14, that incorporates at least one assembly 10. In an aspect of the embodiment shown in the figures, the PDU 12 includes a pair of assemblies 10 connected to the housing 14. The assemblies 10 are configured to be coupled to a drive shaft 16. The PDU 12 includes also necessary motor and gear assemblies, generally indicated at 18, for turning and/or raising the solid-tire-and-hub assemblies 10 so that the solid-tire-and-hub assemblies 10 are positioned above the main cargo deck of the cargo-loading system of the aircraft and able to contact a bottom of a ULD.

It should be readily appreciated that the solid-tire-and-hub assembly 10 or assemblies 10, housing 14, drive shaft 16, and motor and gear assemblies 18 can have any suitable structural relationship with each other. It should be readily appreciated also that the PDU 12 can incorporate any suitable number of solid-tire-and-hub assemblies 10. It should be readily appreciated also that the solid-tire-and-hub assembly 10 or assemblies 10 can be connected to the housing 14 in any suitable manner. It should be readily appreciated also that each of the housing 14, drive shaft, and motor and gear assemblies 18 can have any suitable shape, size, and structure and structural relationship with a remainder of the PDU 12. It should be readily appreciated also that the PDU 12 can include any suitable number of motor and gear assemblies 18. It should be readily appreciated also that the motor and gear assemblies 18 can turn and/or raise the solid-tire-and-hub assemblies 10 in any suitable manner so that the solid-tire-and-hub assemblies 10 are positioned above the main cargo deck of the cargo-loading system of the aircraft and able to contact a bottom of a ULD. It should be readily appreciated also that the PDU 12 can include any other suitable structural elements as well each of which can have any suitable structural relationship with a remainder of the PDU 12.

Figure 3:
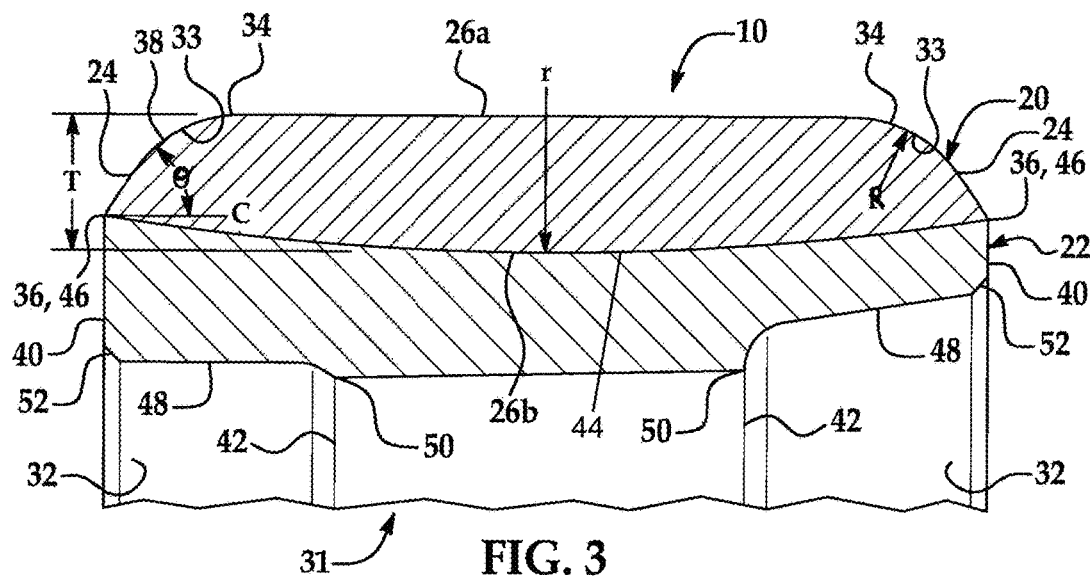
FIG. 3 is a partial transverse cross-sectional view of a non-limiting exemplary embodiment of a solid-tire-and-hub assembly of the PDU illustrated in FIGS. 1 and 2 according to the invention.
Figure 4:
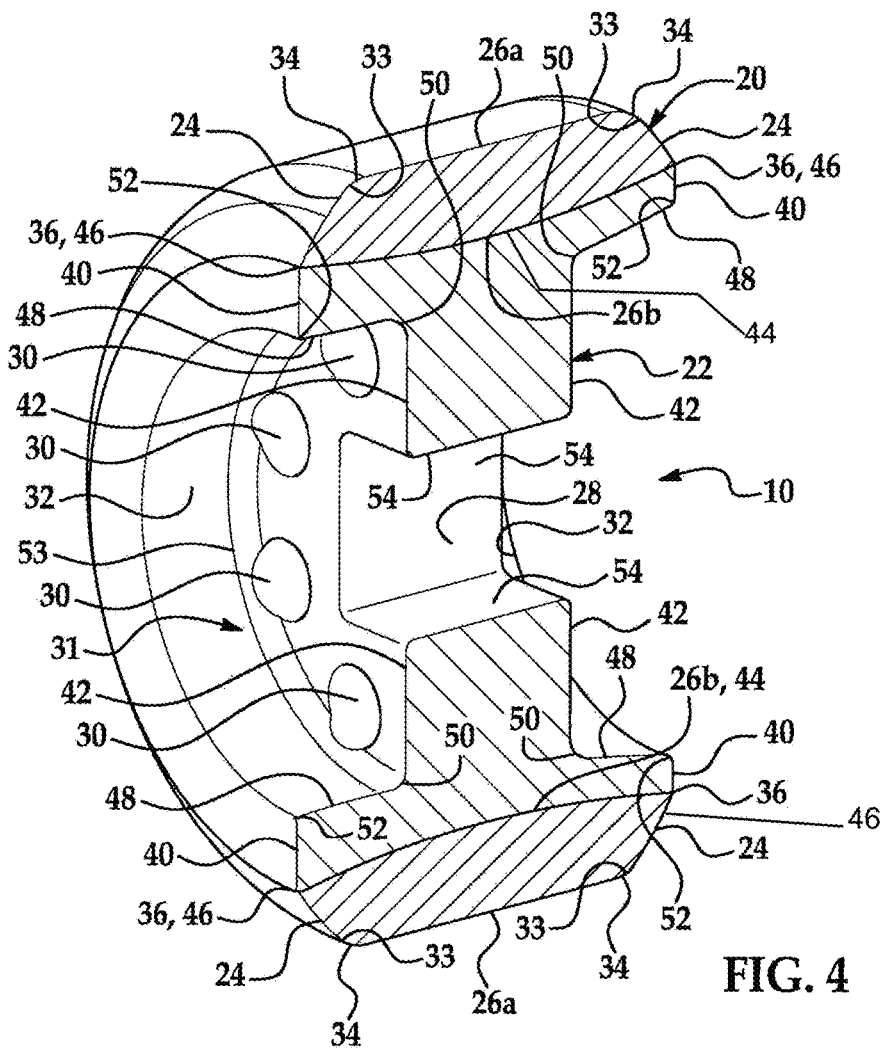
FIG. 4 is a partial perspective view of the embodiment of the solid-tire-and-hub assembly illustrated in FIG. 3.

Referring now to FIGS. 3 and 4, each solid-tire-and-hub assembly 10 includes, in general, a solid tire, generally indicated at 20, and a partially hollow hub, generally indicated at 22. The tire 20 is disposed about the hub 22, and the hub 22 is configured to receive the drive shaft 16. The tire 20 defines a pair of opposed, spaced side surfaces 24 and a pair of opposed, spaced facial surfaces 26 extending between the side surfaces 24 such that the tire 20 defines a substantially trapezoidal transverse cross-section. The hub 22 defines a substantially "I" transverse cross-section substantially aligned with the cross-section of the tire 20. The hub 22 defines also an axial aperture 28 configured to receive the drive shaft 16 and a plurality of holes 30 defined about the aperture 28 (FIG. 4 only).

More specifically, in aspects of the embodiment and referring to FIG. 4, a left half of the assembly 10 is symmetrical with and a mirror image of a right half of the assembly 10, and a top half of the assembly 10 is symmetrical with and a mirror image of a bottom half of the assembly 10 (when viewing the particular cross-section of the assembly 10 shown in the figure). In this way, for instance, the "trapezoid" of the cross-section of the tire 20 is upright at a top of the figure and inverted at a bottom of the figure such that the "trapezoids" are mirror images of each other. Also, the tire 20 is cylindrical and completely solid, and the hub 22 defines a disk-shaped core, generally indicated at 31, that is solid (except for the axial aperture 28 and holes 30) and a pair of disk-shaped voids 32 disposed on respective sides of the core 31. In the example shown, the voids 32 define a same width with respect to each other, and the core 31 is wider than each of the voids 32. However, it should be readily appreciated that each of the core 31 and voids 32 can have any suitable width such that the assembly 10 defines any suitable width. It should be readily appreciated that the tire 20 can disposed about the hub 22 in any suitable manner (such as integrally).

Referring back to FIGS. 3 and 4, an interior outer portion 33 of each of the side surfaces 24 of the tire 20 is arcuate such that the interior outer portions 33 are convex with respect to the hub 22. A remainder of each of the side surfaces 24 can be linear or arcuate. In the example shown, the remainder of each of the side surfaces 24 is substantially linear.

The facial surfaces 26 of the tire 20 include an exterior facial surface 26a that extends between corresponding exterior edges 34 of the side surfaces 24 and is substantially planar in the cross-section. An interior facial surface 26b extends between corresponding interior edges 36 of the side surfaces 24 and is arcuate and substantially convex with respect to the exterior facial surface 26a and in contacting relationship with the hub 22. The exterior facial surface 26a is shorter than the interior facial surface 26b (and the side surfaces 24 are a same length with respect to each other and shorter than the exterior and interior facial surfaces 26a, 26b).

In further aspects and as shown in FIG. 3 only, a maximum thickness "T" of the tire 20 through the cross-sections is about 4.4 mm. Also, a radius of curvature "R" of the interior outer portion 33 of each of the side surfaces 24 is about 4.0 mm. Furthermore, an angle "θ" from an imaginary chord "C" extending between the interior edges 36 of the tire 20 to a corresponding substantially linear interior central portion 38 of each side surface 24 is about 54.0 degrees. In addition, an arc radius "r" of the interior facial surface 26b is about 90 mm. These parameters ("T," "R," "θ," and "r") of each profile of the solid-tire-and-hub assembly 10 can be optimized to achieve optimal results of measurement of strains (according to acceptable limits thereof).

It should be readily appreciated that each the maximum thickness "T" of the tire 20 through the cross-sections, radius of curvature "R" of the interior outer portion 33 of each of the side surfaces 24, angle "θ" from the imaginary chord "C" to the corresponding interior central portion 38 of each side surface 24, and arc radius "r" of the interior facial surface 26b can be any suitable amount or size.

In further aspects, the hub 22 defines a pair of opposed, spaced, substantially linear outer side surfaces 40 disposed flush with the side surfaces 24 of the tire 20. The hub defines further a pair of opposed, spaced, substantially linear inner side surfaces 42. The outer and inner side surfaces 40, 42 of the hub 22 are disposed perpendicular to the exterior facial surface 26a of the tire 20. The inner side surfaces 42 are longer than the outer side surfaces 40. However, it should be readily appreciated that the outer and inner side surfaces 40, 42 and can be any suitable length.

An exterior facial surface 44 extends between corresponding exterior edges 46 of the outer side surfaces 40 of the hub 22. The exterior facial surface 44 of the hub 22 also is arcuate and substantially concave with respect to the tire 20 and in contacting relationship with the interior facial surface 26b of the tire 20. In a version of this aspect, an entirety of the exterior facial surface 44 of the hub 22 is in contacting relationship with an entirety of the interior facial surface 26b of the tire 20. A radius of curvature of the exterior facial surface 44 of the hub 22 [and, in turn, the arc radius "r" of about 90 mm of the interior facial surface 26b of the tire 20] is less tight than the radius of curvature "R" of the interior outer portion 33 of each of the side surfaces 24 of the tire 20. However, it should be readily appreciated that the radius of curvature of the exterior facial surface 44 of the hub 22 can be any suitable radius.

A pair of opposed, spaced interior facial surfaces 48 of the hub 22 are defined on respective sides of the core 31 of the hub 22. More specifically, each of the pair of interior facial surfaces 48 of the hub 22 extends between correspondingly an exterior edge 50 of the inner side surface 42 to an interior edge 52 of the outer side surface 40 of the hub 22. Each interior facial surface 48 can define at least one tread, groove, or dimple (a tread being shown in FIG. 4 at 53 extending along an entirety of the interior facial surface 48 and adjacent to the core 31). In this regard, it should be readily appreciated that each of the tread(s) 53 can have any suitable shape, size, and structure and relationship with a remainder of the interior facial surface 48 and the interior facial surface 48 can define any suitable number of treads 53. The interior facial surfaces 48 are shorter than the exterior facial surface 44 of the hub 22. In the particular cross-section of the hub 22 shown in FIG. 4, the outer side surfaces 40, exterior and interior facial surfaces 44, 48, and a corresponding surface of the core 31 define a substantially rectangular cross-section of the hub 22. Also, a thickness of the hub 22 (minus the core 31) is less than the maximum thickness "T" of the tire 20 through the cross-sections. However, it should be readily appreciated that the thickness of the hub 22 (minus the core 31) can be any suitable thickness.

The aperture 28 extends through the core 31 of the hub 22 (FIG. 4 only). At least one innermost surface 54 is defined by the aperture 28. In the example disclosed, the aperture 28 is substantially cubical such that four innermost rectangular surfaces 54 are defined (although only three innermost surfaces 54 are shown). In such case, the aperture 28 is configured to receive a drive shaft 16 defining a rectangular transverse cross-section. However, it should be readily appreciated that the aperture 28 can be any suitable shape. For example, the aperture 28 can be disk-shaped such that only one innermost ring-shaped surface 54 is defined. In such case, the aperture 28 would be configured to receive a drive shaft 16 defining a circular transverse cross-section.

The holes 30 extend through the core 31 of the hub 22 as well and are identical with respect to each other and spaced substantially uniformly with respect to each other and circularly about the aperture 28. In the example shown, each hole 30 defines a circular transverse cross-section and is smaller than the aperture 28. Also in this example, a portion of each of the holes 30 defines a portion of the corresponding interior facial surface 48 of the hub 22, and the holes 30 are spaced from the aperture 28. However, it should be readily appreciated that each hole 30 can have any suitable shape, size, and relationship with a remainder of the hub 22. It should be readily appreciated also that the hub 22 can define any suitable number of holes 30.

In further aspects, the solid-tire-and-hub assembly 10 defines a two-inch or three-inch diameter. However, it should be readily appreciated that the assembly 10 can define any suitable diameter. It should be readily appreciated also that there is no significant change in area among various cross-sections of the assembly 10, which cross-sections are dictated by a design envelope of the assembly 10. In an aspect, a significant change in such design envelope is permitted. In this way, a bottom surface (i.e., the exterior facial surface 26a) of the assembly 10 can be moved down to enlarge a surface area of the bottom surface 26a, thereby allowing a tractive load to act on a larger area and, in turn, help to achieve a significant reduction in the offset edge and center strains. In fact, geometrical dimensions and scale of the assembly 10 can vary depending upon the nature and size of loads exerted on the tire 20 and particular applications. Further, the tire 20 is made of any suitable rubber or elastomeric. It should be readily appreciated, however, that each of the tire 20 and hub 22 can be made of any suitable material.

The assembly 10 defines particular constant and varying profiles or cross-sections through a periphery of the assembly 10 and respective design features. These profiles and features achieve a significant reduction in the edge strain of the assembly 10 while keeping the center strain of the assembly 10 substantially unchanged. Also, performance of the assembly 10 is enhanced and highly reliable without any significant change to a size, shape, or manufacturing process of the assembly 10. Furthermore, the assembly 10 is highly durable (i.e., does not crack) such that life of the assembly 10 is extended. In addition, the assembly 10 allows the tractive load to act on a larger area of the assembly 10 and, in turn, help to achieve a significant reduction in the offset edge and center strains.

While the invention has been described in detail in connection with only a limited number of embodiments, it should be readily appreciated that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various non-limiting embodiments of the invention have been described, it should be readily appreciated that aspects of the invention may include only some of the described embodiments. Accordingly, the invention is not to be seen as limited by the foregoing description, but is only limited by the scope of the appended claims.

What is claimed:

1. A solid-tire-and-hub assembly comprising:
  a solid tire defining a pair of opposed, spaced side surfaces and a pair of opposed, spaced facial surfaces extending between the side surfaces such that the solid tire defines a substantially trapezoidal transverse cross-section, the side surfaces being axially outward of one of the facial surfaces; and
  a partially hollow hub about which the solid tire is disposed and defining a substantially "I" transverse cross-section substantially aligned with the cross-section of the solid tire, an axial aperture configured to receive a drive shaft, and a plurality of holes defined about the aperture, wherein rotation of the drive shaft causes rotation of the solid tire;
  wherein an interior side of each of the side surfaces of the solid tire is continuous and arcuate with a radius of curvature,
  wherein the facial surfaces of the solid tire include an exterior facial surface extending between corresponding exterior edges of the side surfaces and an interior facial surface extending between corresponding interior edges of the side surfaces and being arcuate and substantially convex with respect to the exterior facial surface and in contacting relationship with the hub;
  wherein an angle from an imaginary chord extending between the corresponding interior edges of the solid tire to a substantially linear interior central portion of each side surface is 54.0 degrees.

2. The solid-tire-and-hub assembly of claim 1, wherein a maximum thickness of the solid tire through the cross-section is 4.4 mm.

3. The solid-tire-and-hub assembly of claim 1, wherein the radius of curvature of the interior side of each of the side surfaces of the solid tire is 4.0 mm.

4. The solid-tire-and-hub assembly of claim 1, wherein an arc radius of the interior facial surface of the solid tire is 90 mm.

5. The solid-tire-and-hub assembly of claim 1, wherein the hub defines:

a pair of opposed, spaced, substantially linear outer side surfaces;
  a pair of opposed, spaced, substantially linear inner side surfaces;
  an exterior facial surface extending between corresponding exterior edges of the outer side surfaces of the hub and being arcuate and substantially concave with respect to the solid tire and in contacting relationship with the interior facial surface of the solid tire;
  a pair of opposed, spaced interior facial surfaces each of which extends between correspondingly an exterior edge of the inner side surface to an interior edge of the outer side surface of the hub; and
  at least one innermost surface defined by the aperture.

6. The solid-tire-and-hub assembly of claim 5, wherein the aperture and holes extend through a core of the hub.

7. A power-drive unit comprising:
  a housing;
  a drive shaft; and
  at least one solid-tire-and-hub assembly connected to the housing and including:
    a solid tire defining a pair of opposed, spaced side surfaces and a pair of opposed, spaced facial surfaces extending between the side surfaces such that the solid tire defines a substantially trapezoidal transverse cross-section, the side surfaces being axially outward of one of the facial surfaces; and
    a partially hollow hub about which the solid tire is disposed and defining a substantially "I" transverse cross-section substantially aligned with the cross-section of the solid tire, an axial aperture configured to receive a drive shaft, and a plurality of holes defined about the aperture, wherein rotation of the drive shaft causes rotation of the solid tire;
  wherein an interior side of each of the side surfaces of the solid tire is continuous and arcuate with a radius of curvature,
  wherein the facial surfaces of the solid tire include an exterior facial surface extending between corresponding exterior edges of the side surfaces and an interior facial surface extending between corresponding interior edges of the side surfaces and being arcuate and substantially convex with respect to the exterior facial surface and in contacting relationship with the hub;
  wherein an angle from an imaginary chord extending between the corresponding interior edges of the solid tire to a substantially linear interior central portion of each side surface is 54.0 degrees.

8. The power-drive unit of claim 7, wherein a maximum thickness of the solid tire through the cross-section is 4.4 mm.

9. The power-drive unit of claim 7, wherein the radius of curvature of the interior side of each of the side surfaces of the solid tire is 4.0 mm.

10. The power-drive unit of claim 7, wherein an arc radius of the interior facial surface of the solid tire is 90 mm.

11. The power-drive unit of claim 7, wherein the hub defines:
  a pair of opposed, spaced, substantially linear outer side surfaces;
  a pair of opposed, spaced, substantially linear inner side surfaces;
  an exterior facial surface extending between corresponding exterior edges of the outer side surfaces of the hub and being arcuate and substantially concave with respect to the solid tire and in contacting relationship with the interior facial surface of the solid tire;

a pair of opposed, spaced interior facial surfaces each of which extends between correspondingly an exterior edge of the inner side surface to an interior edge of the outer side surface of the hub; and at least one innermost surface defined by the aperture.

\* \* \* \* \*